(12) United States Patent
Peterson

(10) Patent No.: US 9,114,751 B2
(45) Date of Patent: Aug. 25, 2015

(54) UNIVERSAL TOWER TRANSPORT STAND

(75) Inventor: Eric M. Peterson, Oviedo, FL (US)

(73) Assignee: Siemens Aktiengesellschaft, München ( * ) Notice: Subject to any disclaimer, the term of this patent is extended or adjusted under 35 U.S.C. 154(b) by 567 days.

(21) Appl. No.: 12/917,982

(22) Filed: Nov. 2, 2010

(65) Prior Publication Data

US 2012/0107065 A1     May 3, 2012

(51) Int. Cl.
*B60P 7/08* (2006.01)
*B60P 7/12* (2006.01)
*F03D 1/00* (2006.01)

(52) U.S. Cl.
CPC ... *B60P 7/12* (2013.01); *B60P 7/08* (2013.01); *F03D 1/005* (2013.01); *F05B 2260/02* (2013.01); *Y02E 10/72* (2013.01)

(58) Field of Classification Search
CPC .............. B60P 7/15; B60P 7/08; F03D 1/005; F05B 2260/02; Y02E 10/72
USPC ............... 410/44, 47, 45, 46, 48, 49, 50, 120, 410/155; 280/404; 248/146, 671, 351, 248/346.01, 346.03, 188.7; 206/389, 446; 211/85.18

See application file for complete search history.

(56) References Cited

U.S. PATENT DOCUMENTS

| | | | |
|---|---|---|---|
| 816,426 A | 3/1906 | Brew et al. | |
| 2,590,934 A | 4/1952 | Catlett | |
| 2,895,299 A | 7/1959 | Washabaugh | |
| 4,378,192 A | 3/1983 | Gross | |
| 4,621,972 A | 11/1986 | Grotte | |
| 4,988,089 A | 1/1991 | Knijpstra | |
| 5,931,544 A * | 8/1999 | Dietrich | 301/58 |
| 7,303,365 B2 * | 12/2007 | Wobben | 410/45 |
| 2006/0272244 A1 | 12/2006 | Jensen | |
| 2008/0187424 A1 | 8/2008 | Garcia | |

* cited by examiner

Primary Examiner — Stephen Gordon

(57) ABSTRACT

A support system (10), including: a spoke connection region (30); a support stand (20) configured to support the spoke connection region (30); and a plurality of spokes (14). Each spoke (14) includes an inner end (34) connectable to a respective spoke connection point disposed in the spoke connection region (30), and each spoke (14) is independently positioned angularly about the respective spoke connection point (30).

7 Claims, 3 Drawing Sheets

UNIVERSAL TOWER TRANSPORT STAND

FIELD OF THE INVENTION

This invention relates to a support system. In particular this invention relates to a system used to support large, hollow, cylindrical objects.

BACKGROUND OF THE INVENTION

Wind turbine components are often fabricated at a location other than the location where the wind turbine is to be installed. With rotor diameters of up to 100 meters, and increasing, windmills are too large to be shipped in an assembled condition. Consequently a tower portion may be broken down into three or more sections and transported in a horizontal orientation. When assembled and upright the tower sections are structurally secure, but individual towers in a horizontal orientation are less structurally sound, and are still very large when compared to most items transported by trucks, trains, and boats. As a result specialized techniques for transporting the sections have been devised, but there is room for improvement in the art.

BRIEF DESCRIPTION OF THE DRAWINGS

The invention is explained in the following description in view of the drawings that show.

DETAILED DESCRIPTION OF THE INVENTION

Figure 1:
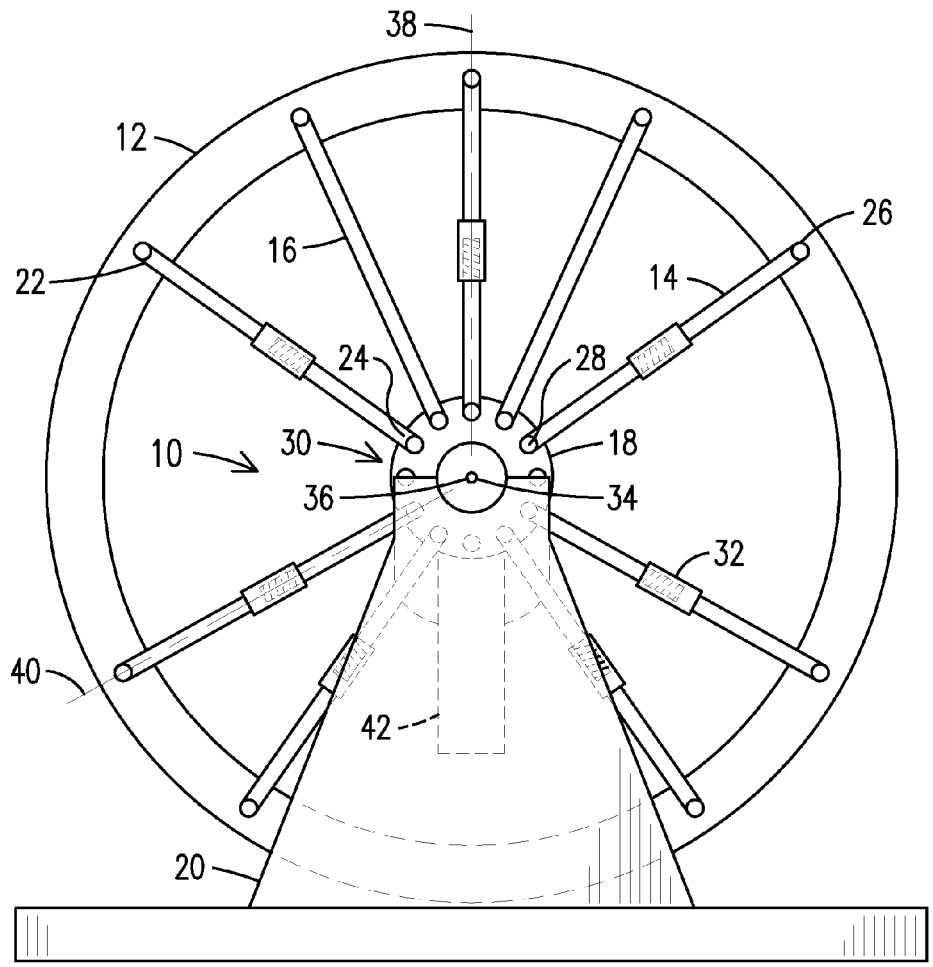
FIG. 1 is an end view of a universal tower transport system assembled to a tower section.

Wind turbine tower sections are large and difficult to transport from the manufacturing site to the installation site. Prior methods of transporting tower sections have required labor intensive rigging operations, disassembling individual tower sections into further components, or complex and specialized systems. For example, one method of transporting tower sections requires lifting the tower section onto support cradles prepositioned on a means of transportation, such as a truck trailer, or a rail car. The support cradles are spaced along the length of the tower, and the tower is lifted on the cradles. Once in position the tower is strapped into position. However, cylindrical structures are less structurally sound when on their side, and these structures may tend to sag under the force of gravity, and this may be made worse when the straps securing the tower section to the means of transportation are tightened. During transportation it is also possible that rough road or sea conditions may negatively contribute to this sagging.

Another method of transportation may involve further disassembling each tower section into components. For example, one tower section may be disassembled into two, three, or more components. Such a method results in smaller components, but this method is labor intensive and time consuming. Yet another method may involve a system that may be part of a trailer, for example, and may grasp an upright tower section and transition it to a horizontal position on the trailer. Such a system is expensive, specialized, and not commonly available.

In contrast, the inventor has innovatively devised a system for transporting individual tower sections that is simple, easily adaptable to accommodate different size tower sections, and compatible with conventional and readily available rigging equipment. The universal tower transport system uses a stand, a hub, and spokes for each end of a tower section. One set of spokes attaches an end of the tower section to the center hub in a manner similar to how bicycle tire spokes connect the wheel to the axle. A radially outer end of each spoke connects to the tower, and a radially inner end of each spoke connects to the hub. Tower sections conventionally have flanges disposed radially inward at each end. These flanges are used to connected tower sections to each other, but may be used as connection points for the outer ends of the spokes. Pins, or bolts etc may be used to connect the spokes to the tower section flange, as well as any commonly used means for such connections. The spokes are connected to the hub under enough tension to permit the hub to act as a support for the tower section end. The tower section can be lifted using conventional rigging techniques with the hub as the connection point for each end of the tower. Once lifted the hubs can be positioned in respective support stands. Once the hubs are secured to their respective support stands the tower is ready for transport. Optionally, support cradles can also be positioned along the length of the tower section.

The universal tower support system provides several advantages over other transportation techniques. The system components are simple and inexpensive and relatively small in design. As a result, problems associated with a lack of component availability due to cost associated with expensive and specialized equipment are reduced. The components are relatively small so the components themselves can be transported with relative ease to where they are needed. The simplicity of the component design lends them to easy incorporation into standard rigging practices, reducing a need for specialized training. Furthermore, simple components tend to last longer, reducing costs associated with component replacement.

The system itself is flexible in terms of accommodating different size tower sections. For example, some or all of the spokes can be adjustable in length, so fewer spokes can accommodate a range of tower sizes. This means fewer spokes and easier installation, which contributes further to the cost effectiveness of the system. Alternatively, the spokes can be of fixed length. A fixed length provides for extremely simple and inexpensive spokes, and straightforward installation and the reduced cost may offset the cost of additional spokes for different size tower sections. In both cases those installing the system will know that the system components will fit every time, increasing confidence in scheduling, and reducing costs associated with delays caused by incorrect fits.

The system itself is also flexible in terms of ease of use with the different modes of transportation. For example, a second set of stands can be prepositioned on a second mode of transportation, such as a rail car. The tower can be transported to the rail car on a conventional tractor trailer, lifted from the trailer, and placed directly on the rail car. Such a transfer is common, and thus the simplicity of the transfer using this universal tower transport system saves time and money.

Turning to the drawings, FIG. 1 shows an end view of a universal tower transport system 10 assembled to a tower section 12. The universal tower transport system 10 includes adjustable length spokes 14, fixed length spokes 16, or both, a hub 18, and a support stand 20. In an embodiment all spokes in a set will either be adjustable or all will be of fixed length. Spokes 14, 16 include an outer end 22, and an inner end 24. The outer end 22 may be connected to a tower connection point 26, and the inner end 24 may be connected to the hub 18 at a spoke connection point 28 disposed in a spoke connection region 30 of the hub 18. The adjustable length spokes 14 can be adjusted by any means known in the art, such as by a threaded connection 32. The hub 18 rests in the support stand 20.

A diameter at one end of the tower section 12 may or may not be the same diameter as the diameter at a second end of the tower section 12. As a result, spokes 14, 16 may be of different sizes depending on where they are to be placed. It is envisioned that a tower section longitudinal axis 34 be parallel to the ground during transportation, as well as the surface on which the support stands 20 rest. In an embodiment, the tower section longitudinal axis 34 will be the same as each of the hub longitudinal axes 36. However, it is understood that it is possible that misalignments may occur. In fact, in certain cases it may be desirable for the hub axes (not shown) to align with each other, but not align with the tower section longitudinal axis 34. For example, if the hub axes align but are slightly above the center of gravity of the tower section by a known amount, the tower section 12 can be angularly oriented on the support stand 20. In such a case the tower section 12 will be weighted, i.e. it will resist rotation about the hub longitudinal axes because its center of gravity will be below the hub axes. This may provide for more stability during transport. In most cases it is preferred that the tower section 12 not be free to rotate during transportation, regardless of how the rotation is prevented. Features such as a tower door, present in the lowest assembled tower section 12, may require the tower not rotate. Furthermore, as will be described later, the support stand structural support 42 would prevent rotation because when assembled it is disposed between spokes 14, 16. However, rotation can be prevented by conventional means known to those of ordinary skill in the art, such as by clamping the hub so it does not rotate.

Prior to positioning the tower section 12 on the support stands 20, the spokes 14, 16 are attached to the hub 18. At that point in the assembly process each spoke 14, 16 may be in tension in order to hold the hub 18 in position. However, once the hubs 18 are placed in the support stands 20, spokes 14, 16 below the respective hub longitudinal axis 36 may be in tension, while the spokes 14, 16 above the respective hub longitudinal axis 36 may be in compression. Those spokes 14, 16 below the hub longitudinal axis 36 will be lifting up on the respective tower connection points 26, while those above the hub longitudinal axis 36 will be pushing up on the respective tower connection points 26.

Also unlike conventional spokes, an axis may cross the hub longitudinal axis 36 as indicated by spoke longitudinal axis 38, or it may not as indicated by spoke longitudinal axis 40. Thus, in the cases where there is a spoke longitudinal axis 40 that does not cross the hub longitudinal axis 36, extra effort may be required in order to accommodate the effect of the offset caused by the spoke longitudinal axis 40 and properly position the hub 18, but proper hub 18 position is nonetheless a fairly straightforward matter.

Spokes 14, 16 are free to rotate about their respective spoke connection point 28. Further, spokes 14, 16 can be positioned anywhere angularly except where the spokes 14, 16 would interfere with the support stand structural element 42. These features provides an extreme amount of flexibility in fitting the spokes 14, 16 and the hub 18 to the tower section 12, and provide the ability for the universal tower transport system 10 to accommodate nearly and size and shape tower section 12.

The presence of the support stand structural element 42 (discussed later) precludes placing any spokes 14, 16 near the six o'clock region of the hub 18.

Figure 2:
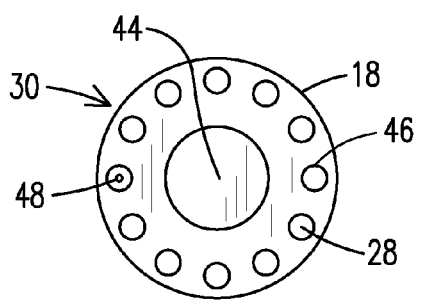
FIG. 2 is an end view of a hub shown in FIG. 1.

FIG. 2 shows an end view of a hub 18 with a spoke connection region 30, and spoke connection points 28. Cylindrical pin 44 with a circular cross section is one embodiment of a portion of the hub 18 designed to be received by the support stand 20. Any shape that can be received by the support stand 20 is envisioned. For example, in an embodiment the pin 44 could be instead take on a square or rectangular cross sectional shape. Such alternate shapes could assist in preventing rotation of the tower section 12 during transport should that be desired. Spoke connection region is also shown with a circular cross section with spoke connection points as spoke connection region holes 46 through the spoke connection region. However, the cross section need not be circular, but may be any shape necessary to accommodate the required spoke connection points 28. In this embodiment the spoke connection region holes 46 have parallel hole longitudinal axes 48 Typically the spokes 14, 16 may be connected to the spoke connection region 30 with bolts or pints through the spoke connection region holes 46. However, instead of spoke connection region holes 46, other means for connecting the spokes 14, 16 to the spoke connection region 30 may be employed. For example, flanges may be welded to the spoke connection region 30 for receiving the spoke inner ends 24. Alternately, spoke inner ends 24 may be welded directly to the spoke connection region 30 etc. All such methods are envisioned by the inventor. Furthermore, although the spoke connection region 30 is shown with a circular cross section, any cross sectional shape is possible, and any arrangement of spoke connection region holes 46 within that region is envisioned. The evenly distributed spoke connection region holes 46 arrangement shown is not meant to be limiting. The spoke connection region holes 46 may be separated angularly by any amount, and be placed any radius from the hub longitudinal axis 36.

Figure 3:
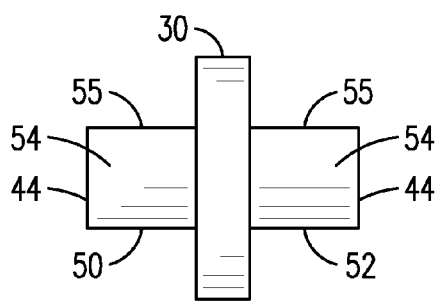
FIG. 3 is a side view of the hub of FIG. 2.

As seen in FIG. 3, a side view of the hub 18, the pin 44 extends from both sides of the spoke connection region 30. Consequently, the support stand 20 can support both pin halves 50, 52 without introducing a moment on the hub 18, which would tend to rotate the hub 18 clockwise if only pin half 50 were supported, or counterclockwise if only pin half 52 were supported. Both pin halves 50, 52 have a hub contact surface 54, which is a portion of the pin surface 55 intended to contact the support stand 20. Typically the support stand 20 will have a matching support stand contact surface (not shown) that will receive the hub contact surface 54. For example, if hub contact surface 54 has a circular cross section, the support stand contact surface may also have a semi circular cross section with dimensions adjusted to receive the hub contact surface 54. Any cross sectional shape is envisioned for the pin 44 and can be accommodated by the support stand 20, including triangular, rectilinear, hexagonal, oval etc. Support stand contact surface also may alternatively not have a matching cross sectional area, and secure mating may be provided by other means, such as bolting the pin 44 down with a shape matched clamp etc.

Figure 4:
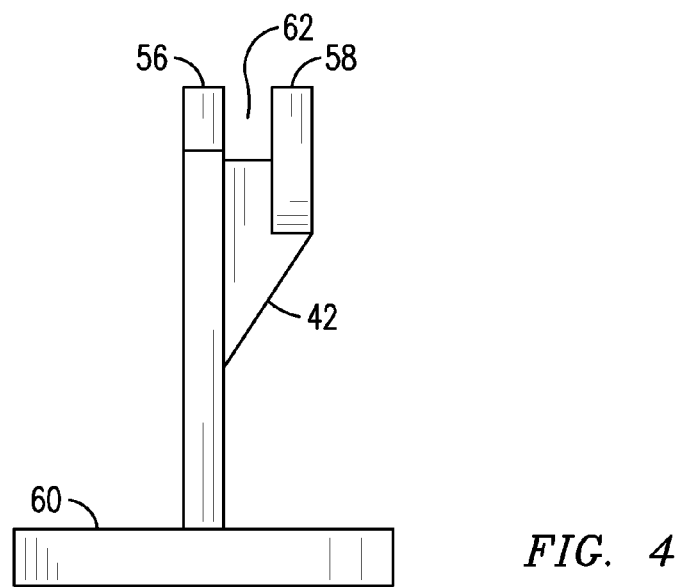
FIG. 4 is a side view of a support stand shown in FIG. 1.

FIG. 4 shows a side view of the support stand 20. Also visible are the support stand outer support 56, the support stand inner support 58, support stand structural element 42 that provides structural support for the support stand inner support 58, and base 60. In this configuration support stand inner support 58 is placed under the hub 18 and between spokes 14, 16, and the hub 18 is lowered onto the support stand 20. This can be achieved via a base slide mechanism (not shown), or manually via traditional rigging techniques.

Support stand recess 62 will accommodate the spoke connection region 30 and may or may not also provide support for the spoke connection region 30 in addition to the support provided by the support stand inner support 58 and the support stand outer support 56.

Figure 5:
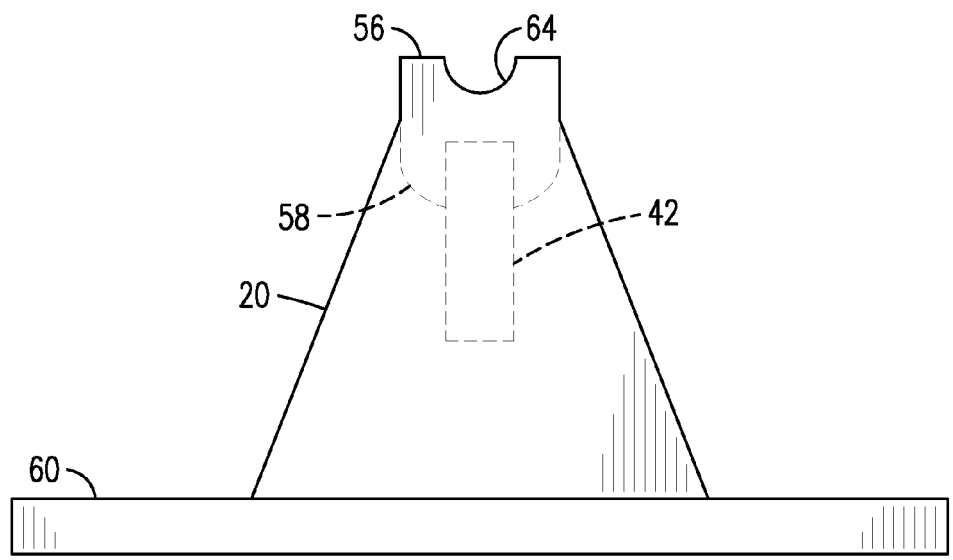
FIG. 5 is an end view of the support stand of FIG. 4.

FIG. 5 shows an end outside view of a support stand 20. Each of the support stand outer support 56 and the support stand inner support 58 has a support stand contact surface 64 configured to receive respective hub contact surfaces 54 and provide support for the hub 18. In this embodiment the support stand contact surface 64 is semi circular to accommodate the circular cross section of the cylindrical pin 44 of this embodiment. However, support stand contact surface 64 can be any shape that will accommodate the pin 44 as needed, and in fact may not match the shape of the pin 44. For example, a pin 44 with a circular cross section may fit into a "v-shaped" support stand contact surface 64.

Figure 6:
FIG. 6 is a support cradle.

Shown in FIG. 6 is a cradle 66 that is used to support the tower section 12 directly. Commonly the cradle 66 will have a shape to match the tower section to be supported, and the cradle will be prepositioned on the trailer, rail car, ship etc., and the tower will be placed on the cradle 66. It is envisioned that the cradle may optionally be used in conjunction with the universal tower transport system 10. The cradle 66 may reduce longitudinal bowing of the tower, and resist any tendency of the tower section 12 to roll during transportation, such as during a change in direction.

Figure 7:
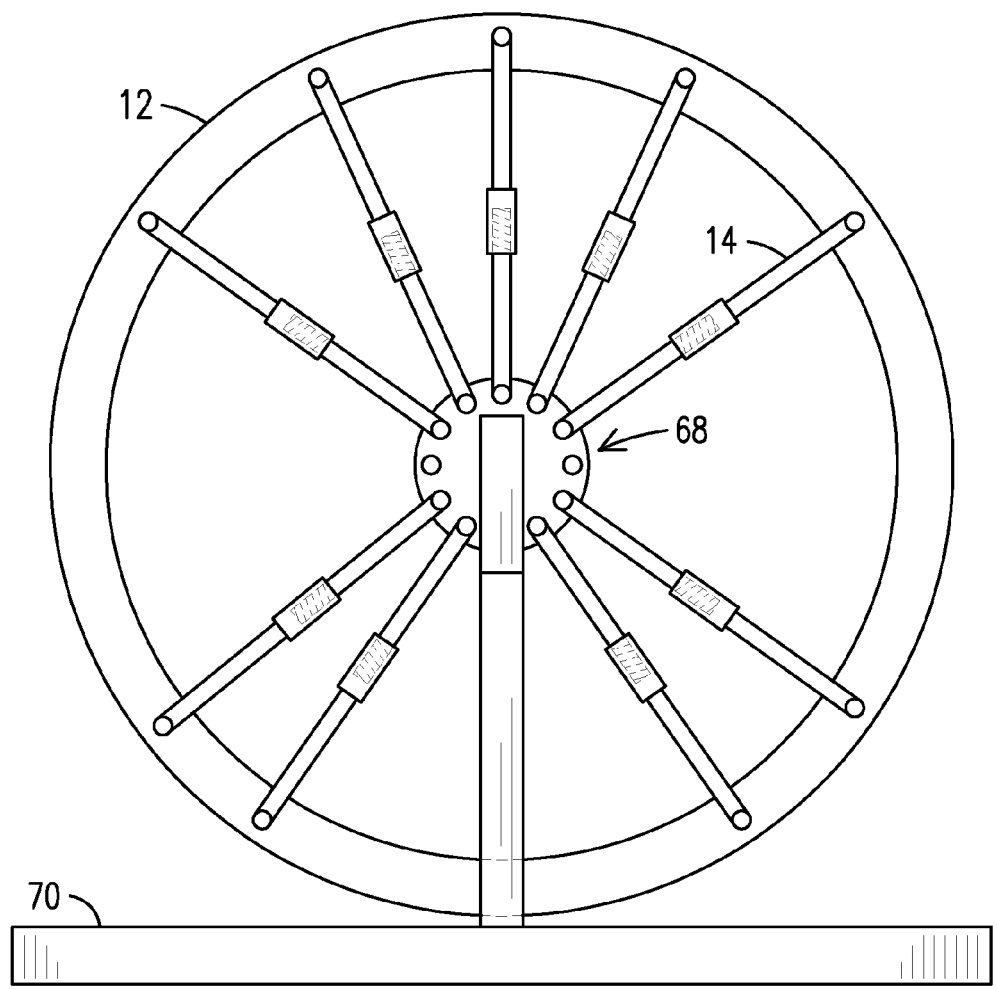
FIG. 7 is an alternate embodiment of the universal tower transport system.
Figure 8:
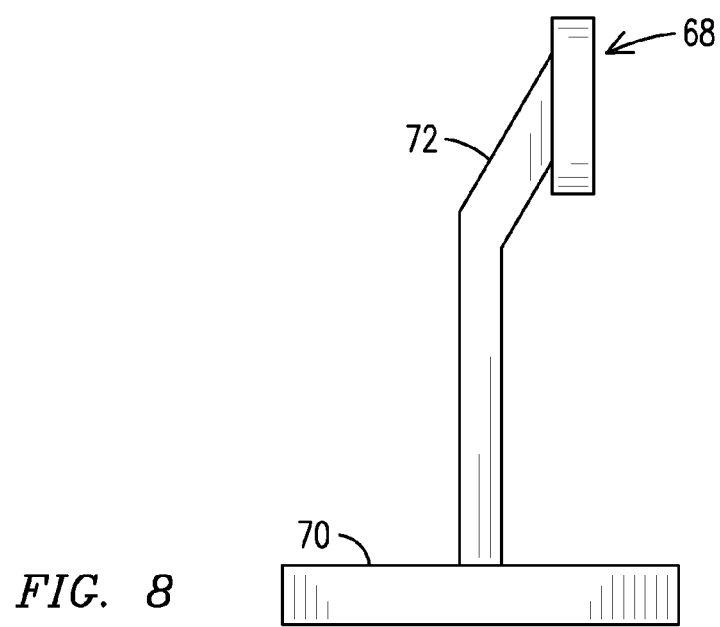
FIG. 8 is a side view of the support stand shown in FIG. 7.

FIG. 7 shows an alternate embodiment of the invention, where the spoke connection region 68 is not a separate hub, but is instead incorporated into the support stand 70 as an integral part. In this embodiment the tower section 12 could be positioned in approximately its supported position, and spokes 14, 16 could be installed between the tower section 12 and the spoke connection region 68. Once all the spokes 14, 16 are connected and properly adjusted, the weight of the tower section 12 would be relieved from the rigging gear and transferred to the support stand 70. FIG. 8 is a side view of the support stand 70 of this embodiment. It can be seen that the support stand structural element 72 may take the illustrated shape in order to properly position the spoke receiving region at the end of the tower section 12.

The support system developed by the inventor and disclosed herein is a simple, inexpensive, and flexible way to transport otherwise cumbersome wind turbine tower section by road, rail, or sea, and represents an improvement over the existing transportation support systems.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A support system comprising:
a hub including a spoke connection region and a hub contact surface;
a support stand with a matching contact surface configured to match and receive at least a portion of the hub contact surface to support the spoke connection region; and
a plurality of spokes, each spoke comprising an inner end connectable to a respective spoke connection point disposed in the spoke connection region, wherein each spoke is independently positioned angularly about the spoke connection region, wherein at least one spoke of the plurality of spokes has a length that is independently adjustable;
wherein the support stand comprises a flat base configured to support the spoke connection region on a ground surface.

2. A support system, comprising:
a hub including a spoke connection region and a hub contact surface;
a support stand with a matching contact surface configured to match and receive at least a portion of the hub contact surface to support the spoke connection region;
a plurality of spokes, each spoke comprising an inner end connectable to a respective spoke connection point disposed in the spoke connection region, wherein each spoke is independently positioned angularly about the spoke connection region, wherein at least one spoke of the plurality of spokes has a length that is independently adjustable; and
a support cradle configured to receive and support a tower at a point between a first tower end and a second tower end.

3. A support system comprising:
a hub comprising a hub contact surface and a spoke connection region;
a support stand configured to support the hub;
a plurality of spokes each spoke comprising an inner end connectable to a respective spoke connection point disposed in the spoke connection region, wherein each spoke is independently positioned angularly about the spoke connection region; and
a support cradle configured to receive and support a tower at a point between a first tower end and a second tower end.

4. The support system of claim 3, wherein a shape of a contact surface of the support cradle is configured to match a shape of the tower supported by the support cradle.

5. The support system of claim 3, wherein the support stand comprises a stand contact surface shape configured to match a shape of at least part of the hub contact surface.

6. The support system of claim 3, wherein the spoke connection region comprises a disc shape.

7. The support system of claim 3, comprising a pin comprising an outer surface comprising the hub contact surface.

\* \* \* \* \*